(12) United States Patent
Kozlowski et al.

(10) Patent No.: US 9,505,637 B2
(45) Date of Patent: Nov. 29, 2016

(54) METHODS OF INHIBITING FOULING IN LIQUID SYSTEMS

(71) Applicant: Ecolab USA Inc., Naperville, IL (US)

(72) Inventors: Walter Kozlowski, Lemont, IL (US); Amit Gupta, Aurora, IL (US)

(73) Assignee: Ecolab USA Inc., Naperville, IL (US)

( * ) Notice: Subject to any disclaimer, the term of this patent is extended or adjusted under 35 U.S.C. 154(b) by 56 days.

(21) Appl. No.: 13/835,720

(22) Filed: Mar. 15, 2013

(65) Prior Publication Data

US 2014/0263086 A1   Sep. 18, 2014

(51) Int. Cl.
| | | |
|---|---|---|
| *C02F 1/50* | (2006.01) | |
| *B01D 37/04* | (2006.01) | |
| *C02F 1/00* | (2006.01) | |
| *C02F 1/72* | (2006.01) | |

(Continued)

(52) U.S. Cl.
CPC .................. *C02F 1/50* (2013.01); *B01D 37/04* (2013.01); *B01D 37/041* (2013.01); *C02F 1/008* (2013.01); *B01D 2201/54* (2013.01); *B01D 2201/56* (2013.01); *C02F 1/001* (2013.01); *C02F 1/32* (2013.01); *C02F 1/72* (2013.01); *C02F 1/722* (2013.01); *C02F 1/76* (2013.01); *C02F 1/78* (2013.01); *C02F 2103/023* (2013.01); *C02F 2209/003* (2013.01); *C02F 2209/005* (2013.01); *C02F 2209/04* (2013.01); *C02F 2301/043* (2013.01); *C02F 2303/20* (2013.01)

(58) Field of Classification Search
CPC .......... C02F 1/44; C02F 1/441; C02F 1/442; C02F 1/444; C02F 1/722; C02F 1/001; C02F 1/008; C02F 1/32; C02F 1/50; C02F 1/72; C02F 1/76; C02F 1/78; C02F 2103/023; C02F 2209/003; C02F 2209/005; C02F 2209/04; C02F 2301/04; C02F 2301/043; C02F 2301/046; C02F 2301/06; C02F 2301/063; C02F 2301/066; C02F 2301/08; C02F 2303/20; B01D 37/00; B01D 37/04; B01D 37/041; B01D 2201/54; B01D 2201/56

See application file for complete search history.

(56) References Cited

U.S. PATENT DOCUMENTS

| 4,719,083 A | 1/1988 | Baker et al. |
| 4,793,932 A | 12/1988 | Ford et al. |

(Continued)

FOREIGN PATENT DOCUMENTS

| BR | 9504673 A | 10/1997 |
| EP | 0719752 A1 | 7/1996 |

(Continued)

OTHER PUBLICATIONS

Ho et. al, Membrane Handbook, 1992, pp. 459 and 576, accessed on Sep. 6, 2014.*

(Continued)

*Primary Examiner* — Lucas Stelling
(74) *Attorney, Agent, or Firm* — Leydig, Voit & Mayer, Ltd.

(57) ABSTRACT

Provided are methods of inhibiting microbial fouling and improving efficiency in biocide dosing in an industrial process containing an aqueous liquid having a biocide demand. In exemplary embodiments, the methods comprise treating an aqueous liquid having a biocide demand with a biocide, monitoring the biocide demand of the aqueous liquid, and filtering a stream of the aqueous liquid. The filtering may be performed in a full-flow or side stream manner.

11 Claims, 6 Drawing Sheets

(51) Int. Cl.
  *C02F 1/76* (2006.01)
  *C02F 1/78* (2006.01)
  *C02F 1/32* (2006.01)
  *C02F 103/02* (2006.01)

(56) References Cited

U.S. PATENT DOCUMENTS

| | | | |
|---|---|---|---|
| 4,929,365 A | | 5/1990 | Clark et al. |
| 5,076,931 A | | 12/1991 | Müller |
| 5,492,632 A | | 2/1996 | Reber |
| 5,576,481 A | | 11/1996 | Beardwood |
| 6,036,866 A | * | 3/2000 | Zimmerman .......... C02F 1/008 210/140 |
| 6,045,331 A | | 4/2000 | Gehm et al. |
| 6,077,435 A | | 6/2000 | Beck et al. |
| 6,180,056 B1 | | 1/2001 | McNeel et al. |
| 6,379,720 B1 | | 4/2002 | Cooper et al. |
| 6,398,965 B1 | | 6/2002 | Arba et al. |
| 6,510,368 B1 | | 1/2003 | Beardwood et al. |
| 6,645,383 B1 | | 11/2003 | Lee et al. |
| 6,855,257 B2 | | 2/2005 | Bonds et al. |
| 7,052,614 B2 | | 5/2006 | Barak |
| 7,252,096 B2 | | 8/2007 | Gill et al. |
| 7,347,946 B2 | | 3/2008 | Patton et al. |
| 8,216,455 B1 | * | 7/2012 | O'Brien .................. C02F 1/30 137/236.1 |
| 2002/0011443 A1 | | 1/2002 | Komatsu et al. |
| 2002/0030011 A1 | * | 3/2002 | Constantine ....... B01D 21/2416 210/512.1 |
| 2003/0127391 A1 | * | 7/2003 | Craft et al. ................... 210/651 |
| 2004/0203088 A1 | | 10/2004 | Ho et al. |
| 2005/0006296 A1 | * | 1/2005 | Sullivan .............. A61M 1/1696 210/321.6 |
| 2005/0109703 A1 | | 5/2005 | Newenhizen |
| 2006/0091046 A1 | | 5/2006 | Rosen et al. |
| 2007/0144966 A1 | | 6/2007 | Janssen et al. |
| 2007/0251889 A1 | | 11/2007 | Singleton et al. |
| 2008/0167445 A1 | | 7/2008 | Podella et al. |
| 2008/0245738 A1 | | 10/2008 | Coulter |
| 2009/0178587 A9 | | 7/2009 | Nalepa |
| 2010/0032375 A1 | | 2/2010 | Jagannathan et al. |
| 2010/0038317 A1 | | 2/2010 | Bissler et al. |
| 2010/0292844 A1 | | 11/2010 | Wolf |
| 2011/0000849 A1 | | 1/2011 | Lee et al. |
| 2011/0120956 A1 | * | 5/2011 | Ivanter .................... B63J 4/002 210/747.5 |
| 2012/0165407 A1 | | 6/2012 | Gupta et al. |
| 2013/0015137 A1 | | 1/2013 | Urmenyi et al. |

FOREIGN PATENT DOCUMENTS

| | | | | |
|---|---|---|---|---|
| GB | 2380474 A | * | 4/2003 | ............... C02F 9/00 |
| KR | 2006-0009127 A | | 1/2006 | |

OTHER PUBLICATIONS

Ripperger et al., Filtration, 1. Fundamentals, Ullmann's Encyclopedia of Industrial Chemistry, pp. 677-682, 2012.*
U.S. Appl. No. 13/183,069, filed Jul. 14, 2011.
U.S. Appl. No. 12/060,296, filed Apr. 1, 2008.
KIPO, International Search Report in International Patent Application No. PCT/US2014/016942, 3 pp., Jun. 5, 2014.
KIPO, Written Opinion in International Patent Application No. PCT/US2014/016942, 4 pp., Jun. 5, 2014.

* cited by examiner

METHODS OF INHIBITING FOULING IN LIQUID SYSTEMS

FIELD

The disclosure is directed to methods of inhibiting fouling in liquid systems by using biocides and filtration techniques.

BACKGROUND

Throughout the world, there are many different types of industrial water systems. Industrial water systems exist at least in part so that necessary chemical, mechanical, and biological processes can be conducted to reach their desired outcomes. Even the best water treatment programs currently available cannot always prevent fouling in industrial water systems. If an industrial water system is not periodically cleaned to remove contaminants, the industrial water system will almost certainly become heavily fouled.

Fouling has a negative impact on the industrial water system. For example, severe mineral scale (i.e., inorganic material) can build on the water contact surfaces. Scale on an industrial water system surface presents an ideal environment for the growth of microorganisms. The presence of microorganisms poses an additional challenge to water treatment of the industrial water system, as biocides, scale inhibitors, and/or corrosion inhibitors may be necessary to maintain efficient operation of the industrial water system.

Evaporative cooling water systems are particularly prone to fouling, which can occur via a variety of mechanisms. Non-limiting examples of fouling mechanisms include deposition of airborne, water-borne, water-formed, and/or microbiological contaminants; water stagnation; process leaks; and other factors. If fouling is allowed to progress, the industrial water system can suffer from decreased operational efficiency, equipment failure, lack of water quality control, and increased health-related risks associated with microbial fouling.

As previously mentioned, microbiological contaminants may cause fouling. Non-limiting sources of microbiological (i.e., microbial) contamination are airborne contamination, makeup water, process leaks, and improperly cleaned process equipment. These microbials can establish colonies on any wettable or even semi-wettable surface of the industrial water system. Once microbial counts are present in the bulk water, within a short period of time, more than 99% of the microbes present in the water will be present on all surfaces within biofilms.

By design, cooling towers are excellent air scrubbers. As a consequence of the cooling process, a cooling tower typically flushes airborne contaminants into the water phase. These contaminants can ultimately find their way to the heat exchanger surfaces, where they become deposited, thereby reducing heat transfer. Non-limiting examples of such contaminants include particulate matter, organic and inorganic contaminants, oils, process contaminants, microorganisms, and so forth. Suspended matter in the cooling water provides the microorganisms with readily available nourishment for sustaining life and reproduction. It is well established that the presence of inorganic, organic, and microbiological deposits have a detrimental impact on the operational parameters of an industrial cooling system, resulting in reduced efficiency and increased operating cost.

A filtration system can be used to at least partially remove particulate contaminants and prevent them from reaching concentrations that can adversely impact efficient cooling system operation. The filtration system may be a full-flow in line system or a partial flow side stream system. The side stream configuration provides particular advantages to the full flow system, such as allowing for a smaller filtration unit and the ability to service off-line while not affecting the cooling process. Generally, the side stream configuration only draws between 2 and 10 percent of the flow as compared to the overall circulation of the cooling system.

Any or a combination of several different types of filters may be utilized for the purpose of filtration, and their use depends on the nature of the water and the level of purification wishing to be attained. Non-limiting examples include sand filters, cartridge filters, screen filters, and membrane filters, which may employ ultrafiltration, microfiltration, reverse osmosis, and forward osmosis. Typically in a filtration system, the water to be cleaned wets and passes through the entire filtration surface, with cleaner water leaving the filtration system as filtrate. When sufficient dirt has collected on the filtration surface, the filtration surface should be cleaned, thereby restoring performance. Methods of cleaning the filtration surface depend on the design of the filtration device. For example, a cartridge filter is not typically cleaned but instead replaced. However, a sand or screen filter will typically undergo a manual or automated backwash cycle to remove the collected contaminants. For membrane filters, there may be similar chemical or non-chemical based cleaning processes, depending on their design.

SUMMARY

In a first exemplary embodiment, the disclosure is directed to a method of inhibiting microbial fouling. The method comprises providing an industrial process that contains an aqueous liquid having a biocide demand and a first filtration surface having a given porosity and operating variables selected from the group consisting of backwash count, vacuum count, pressure drop across the first filtration surface, oxidation-reduction potential, and combinations thereof. The aqueous liquid is treated with a biocide. The biocide demand of the biocide-treated aqueous liquid is determined by monitoring at least one of the operating variables of the first filtration surface. A stream of the biocide-treated aqueous liquid is provided and filtered with the first filtration surface to produce a second stream that is initially returned to the industrial process. The filtering and returning are continued until a steady state with respect to the first filtration surface is reached. Reaching steady state with respect to the first filtration surface is then identified, whereupon the stream of the biocide-treated aqueous liquid is diverted away from the first filtration surface to a second filtration surface having a lower porosity than the first filtration surface. The diverted stream is then filtered with the second filtration surface to produce a third stream, and at least a portion of the third stream is returned to the industrial process.

In a second exemplary embodiment, the disclosure is directed to a method of inhibiting microbial fouling. The method comprises providing an aqueous cooling system that contains an aqueous liquid having a biocide demand. The aqueous liquid is treated with a biocide. At least a portion of the biocide-treated aqueous liquid is diverted to a first filtration surface having a given porosity, thereby producing a first stream. The first stream is filtered with the first filtration surface, thereby producing a second stream. At least a portion of the second stream is filtered with a second filtration surface that is less porous than the first filtration surface, thereby producing a third stream. The biocide demand of the biocide-treated aqueous liquid is determined by monitoring at least one operating variable for the second filtration surface, the at least one operating variable selected from the group consisting of backwash count, vacuum count, pressure drop across the second filtration surface, oxidation-reduction potential, and combinations thereof. At least a portion of the streams is returned to the aqueous cooling system.

In a third exemplary embodiment, the disclosure is directed to an automated method of improving efficiency in biocide dosing into a recirculation-type aqueous cooling system. The method comprises providing a recirculation-type aqueous cooling system that contains an aqueous liquid having a biocide demand. A biocide is dosed into the aqueous liquid at a dosage rate. At least a portion of the biocide-dosed aqueous liquid is diverted into a filtration loop thereby creating a filtration loop stream having a filtration loop flow rate within the aqueous cooling system. The filtration loop stream is sequentially filtered with at least one set of at least two filtration surfaces thereby creating a filtrate. The at least two filtration surfaces are progressively less porous in a downstream direction. Each of the at least one set of at least two filtration surfaces has operating variables selected from the group consisting of backwash count, vacuum count, pressure drop across each set of at least two filtration surfaces, oxidation-reduction potential, and combinations thereof. The biocide demand of the biocide-treated aqueous liquid is determined either intermittently or continuously by monitoring at least one of the operating variables of the at least one set of at least two filtration surfaces. A process parameter based on the determined biocide demand is adjusted. The process parameter is selected from the group consisting of the dosage rate of the biocide, the filtration loop flow rate, a quantity of the at least one set of at least two filtration surfaces, and combinations thereof.

BRIEF DESCRIPTION OF THE DRAWINGS

The advantages of the present disclosure will become more readily apparent to those of ordinary skill in the relevant art after reviewing the following detailed description and accompanying drawings, wherein.

DETAILED DESCRIPTION

Figure 1:
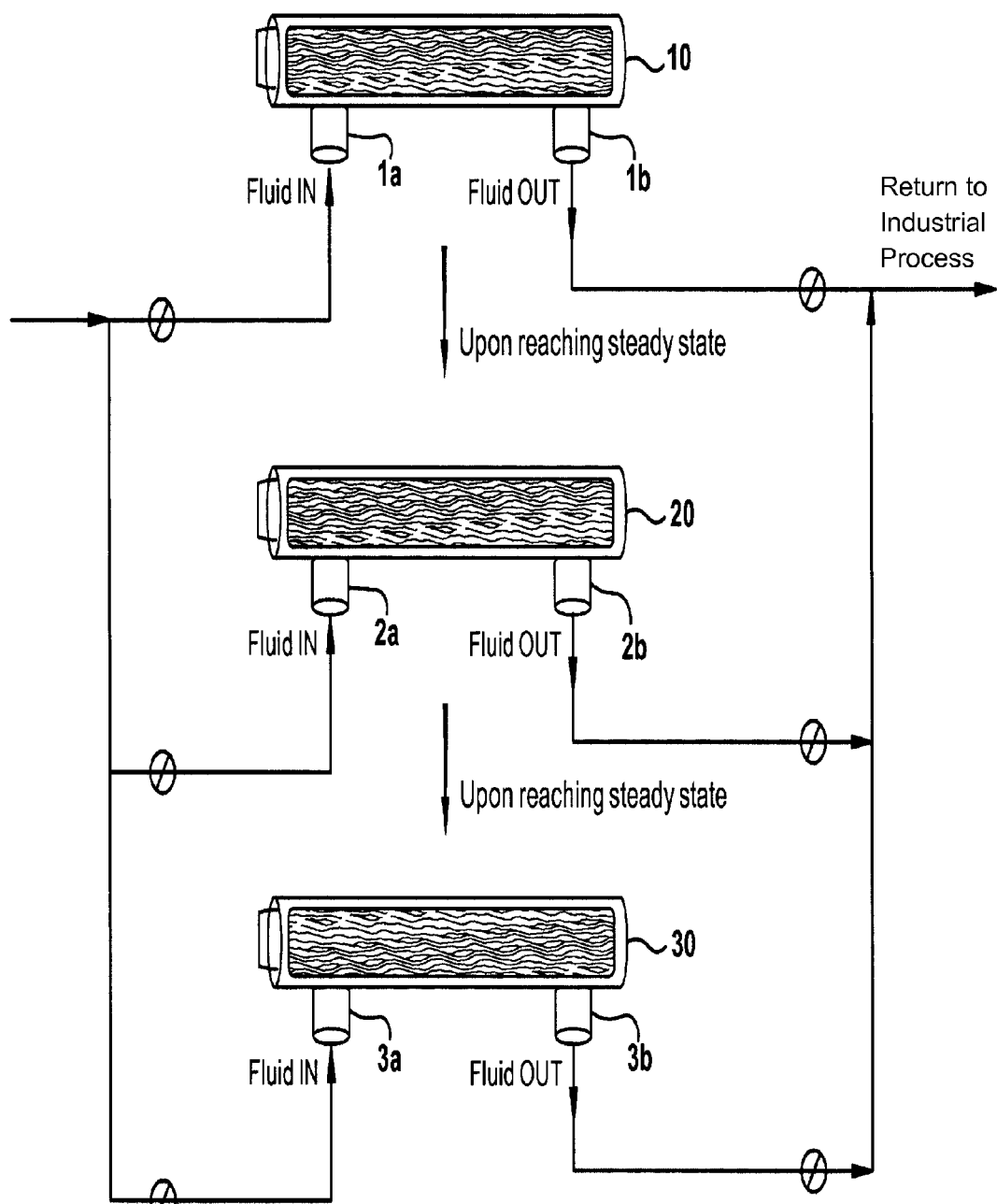
FIG. 1 illustrates an exemplary embodiment of a filtration scheme of the disclosed methods.

While embodiments encompassing the general inventive concepts may take various forms, there is shown in the drawings and will hereinafter be described various embodiments with the understanding that the present disclosure is to be considered merely an exemplification and is not intended to be limited to the specific embodiments.

The disclosure is generally directed to filtration techniques useful for reducing or eliminating microbial fouling and/or improving efficiency of biocide dosing into aqueous industrial liquids. Application of one or more of the disclosed filtration techniques may be particularly useful for aqueous cooling systems.

As it pertains to this disclosure, "fouling" and "contamination" refer to the presence or the deposition of any extraneous or undesirable organic or inorganic material in a water-containing industrial process or onto one or more surfaces within the water-containing industrial process. "Microbial fouling" refers to the presence or deposition of any extraneous or undesirable microbiological organism in a water-containing industrial process.

As it pertains to this disclosure, "aqueous cooling system" refers to a system that uses a water-containing liquid (i.e., aqueous liquid) to cool at least a portion of an industrial process or an enclosed space. A typical aqueous cooling system may utilize any one or combination of a chiller, a cooling tower, and an air washer, to transfer heat energy from the water to another substance.

As it pertains to this disclosure, "stream" refers to a flowing liquid. A non-limiting example of a stream is an aqueous liquid flowing through a pipe.

As it pertains to this disclosure, "steady state" generally refers to a situation in which all state variables are statistically constant (e.g., within a 90% confidence interval of a setpoint or desired value) in spite of ongoing factors that strive to change the variables. For the present disclosure, state variables are generally related to filtration (e.g., number of filtration surfaces, pressure drop across at least one filtration surface, flow rate/flux across at least one filtration surface, number of backwash or vacuum cycles per a period of time, etc.), oxidation-reduction potential, and biocide dosage. For example, a particular filtration reaches steady state when a stream having a reasonably constant flow rate reaches a reasonably constant pressure drop across the filtration surface(s). In certain embodiments, steady state can be determined when a process has reached statistical process control around one or more setpoints or one or more target values for a certain period of time.

As it pertains to this disclosure, "filtration surface" refers to a section of filtration material where filtration takes place. A filtration surface may or may not be housed in a filter element. A filter element (see below) may have one or more filtration surfaces within each element. A filtration surface need not be flat.

As it pertains to this disclosure, "filter element" refers to an interchangeable unit that comprises at least one filtration surface. In certain embodiments of the methods of the present disclosure, each filter element comprises a set of at least two filtration surfaces, wherein the at least two filtration surfaces are progressively less porous in a downstream direction. For purposes of this disclosure, "cartridge" is a species of the generic "element."

As it pertains to this disclosure, "biocide" refers to a substance that is used to kill microbiological organisms or at least inhibit microbiological function (e.g., growth and/or reproduction) that may be present in a second substance.

As it pertains to this disclosure, "biocide demand" refers to the amount of biocide needed to inhibit microbial fouling, which can be monitored based on one or more of several variables described herein.

As it pertains to this disclosure, "automatic," "automatically," "automated," and other similar terms refer to a method or portion thereof that is performed without human intervention or substantially without human intervention.

For example, a process carried out automatically (i.e., an "automated process") would measure a variable and take action (e.g., change a pump speed, open or close a valve, increase heating or cooling, etc.) based on a comparison of the measured variable to a standard value (i.e., a setpoint or a steady state calculation) without a person having to do anything to make the action take place, outside of initially providing all necessary equipment, plumbing, wiring, power, programming, ingredients, and so forth.

In a first exemplary embodiment, the disclosure is directed to a method of inhibiting microbial fouling. The method comprises providing an industrial process that contains an aqueous liquid having a biocide demand and a first filtration surface having a given porosity and operating variables selected from the group consisting of backwash count, vacuum count, pressure drop across the first filtration surface, oxidation-reduction potential, and combinations thereof. The aqueous liquid is treated with a biocide. The biocide demand of the biocide-treated aqueous liquid is determined by monitoring at least one of the operating variables of the first filtration surface. A stream of the biocide-treated aqueous liquid is provided and filtered with the first filtration surface to produce a second stream that is initially returned to the industrial process. The filtering and returning are continued until a steady state with respect to the first filtration surface is reached. Reaching steady state with respect to the first filtration surface is then identified, whereupon the stream of the biocide-treated aqueous liquid is diverted away from the first filtration surface to a second filtration surface having a lower porosity than the first filtration surface. The diverted stream is then filtered with the second filtration surface to produce a third stream, and at least a portion of the third stream is returned to the industrial process.

In a second exemplary embodiment, the disclosure is directed to a method of inhibiting microbial fouling. The method comprises providing an aqueous cooling system that contains an aqueous liquid having a biocide demand. The aqueous liquid is treated with a biocide. At least a portion of the biocide-treated aqueous liquid is diverted to a first filtration surface having a given porosity, thereby producing a first stream. The first stream is filtered with the first filtration surface, thereby producing a second stream. At least a portion of the second stream is filtered with a second filtration surface that is less porous than the first filtration surface, thereby producing a third stream. The biocide demand of the biocide-treated aqueous liquid is determined by monitoring at least one operating variable for the second filtration surface, the at least one operating variable selected from the group consisting of backwash count, vacuum count, pressure drop across the second filtration surface, oxidation-reduction potential, and combinations thereof. At least a portion of the streams is returned to the aqueous cooling system.

In a third exemplary embodiment, the disclosure is directed to an automated method of improving efficiency in biocide dosing into a recirculation-type aqueous cooling system. The method comprises providing a recirculation-type aqueous cooling system that contains an aqueous liquid having a biocide demand. A biocide is dosed into the aqueous liquid at a dosage rate. At least a portion of the biocide-dosed aqueous liquid is diverted into a filtration loop thereby creating a filtration loop stream having a filtration loop flow rate within the aqueous cooling system. The filtration loop stream is sequentially filtered with at least one set of at least two filtration surfaces thereby creating a filtrate. The at least two filtration surfaces are progressively less porous in a downstream direction. Each of the at least one set of at least two filtration surfaces has operating variables selected from the group consisting of backwash count, vacuum count, pressure drop across each set of at least two filtration surfaces, oxidation-reduction potential, and combinations thereof. The biocide demand of the biocide-treated aqueous liquid is determined either intermittently or continuously by monitoring at least one of the operating variables of the at least one set of at least two filtration surfaces. A process parameter based on the determined biocide demand is adjusted. The process parameter is selected from the group consisting of the dosage rate of the biocide, the filtration loop flow rate, a quantity of the at least one set of at least two filtration surfaces, and combinations thereof.

Referring to FIG. 1, an exemplary embodiment of a filtration scheme is illustrated. For the exemplary embodiment illustrated in FIG. 1, a stream 1*a* of an aqueous liquid is provided, wherein the aqueous liquid has been treated with a biocide. The stream 1*a* is filtered with a filtration surface 10, creating a second stream 1*b*. Once steady state filtration (with respect to filtration surface 10) is achieved, the stream 1*a* of the aqueous liquid is diverted (stream 1*a* becomes stream 2*a*) to a filtration surface 20 that has a lower porosity than the filtration surface 10, which is filtered thereby creating a third stream 2*b*. Optionally, upon reaching steady state filtration (with respect to filtration surface 20), the stream 2*a* of the aqueous liquid may be diverted (stream 2*a* becoming stream 3*a*) to a filtration surface 30, which is filtered thereby creating a fourth stream 3*b*. At least a portion of any filtrate stream (streams 1*b*, 2*b* and 3*b*) is returned to the industrial process.

Figure 2:
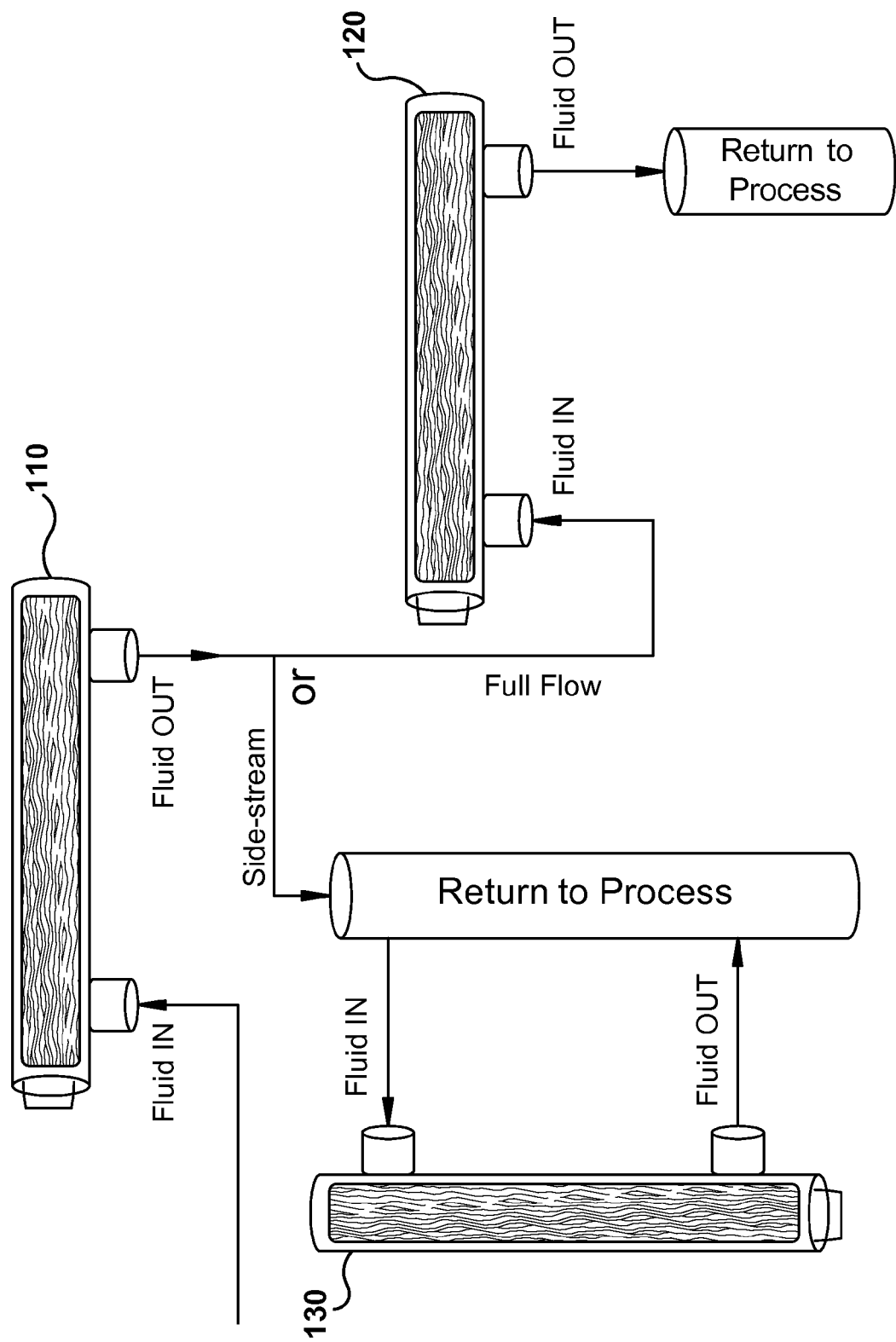
FIG. 2 illustrates an exemplary embodiment of a filtration scheme of the disclosed methods.

Referring to FIG. 2, another exemplary embodiment of a filtration scheme is illustrated. For the exemplary embodiment illustrated in FIG. 2, a stream of an aqueous liquid (Fluid IN) is filtered with a filtration surface 110 having a given porosity. The filtrate (Fluid OUT) may be filtered full-flow with a filtration surface 120 that is less porous than the filtration surface 110. Alternately, the filtrate may be returned to the industrial process, and a side stream (an example of a filtration loop stream) may be filtered with filtration surface 130, wherein filtration surface 130 is less porous than filtration surface 110.

Figure 3:
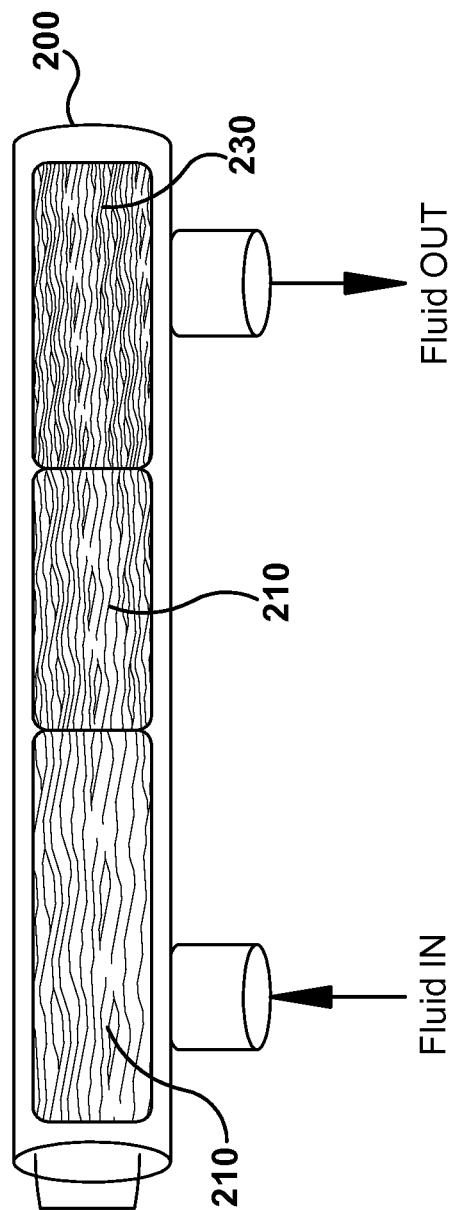
FIG. 3 illustrates an exemplary embodiment of a filtration scheme and a set of filtration surfaces within a filter element of the disclosed methods.

Referring to FIG. 3, FIG. 3 illustrates an exemplary embodiment of a filter element 200 having at least two filtration surfaces. The illustrated embodiment has three filtration surfaces 210, 220, and 230, each progressively less porous than the previous filtration surface in a downstream direction.

Figure 4:
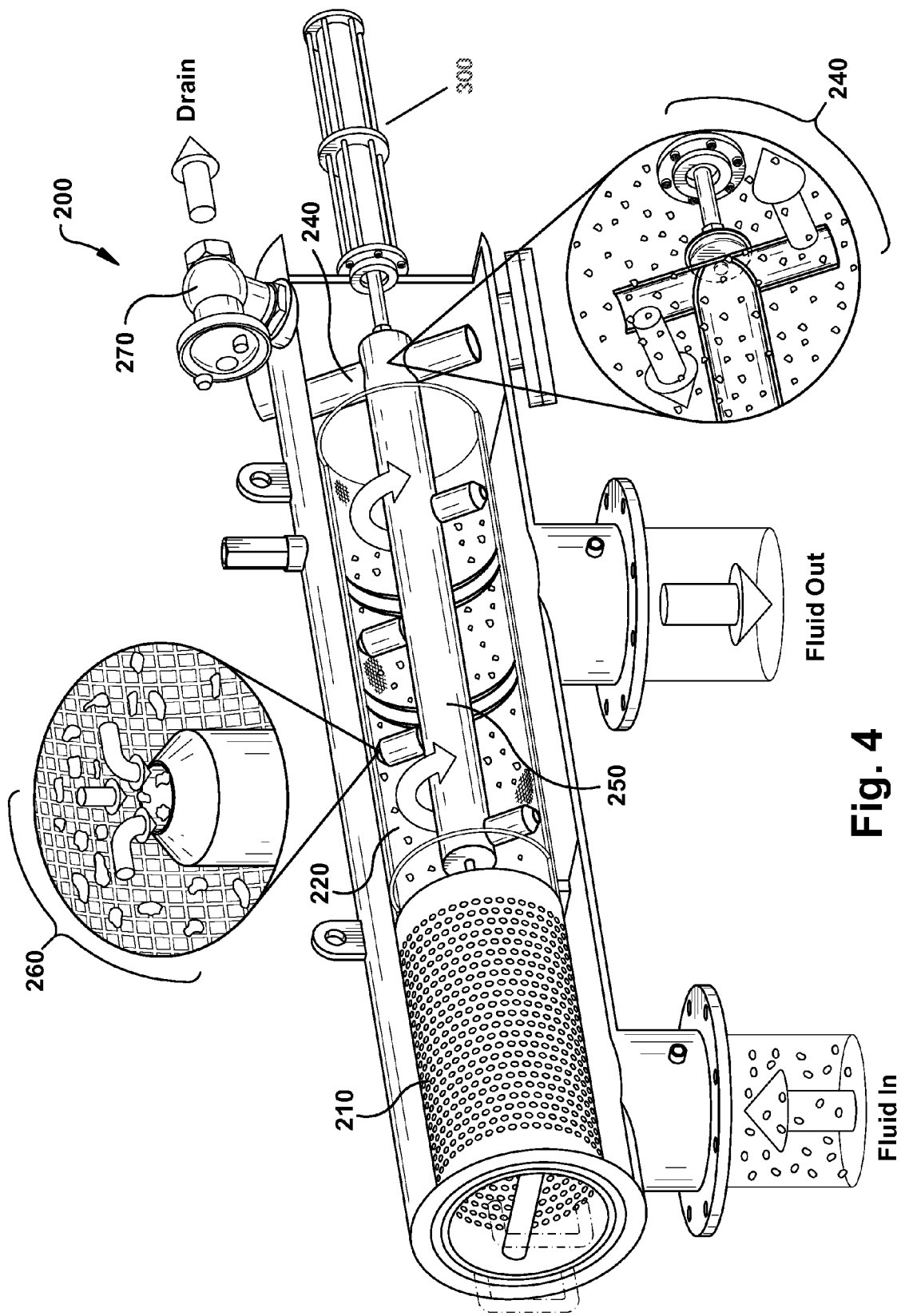
FIG. 4 illustrates an exemplary embodiment of a filtration scheme and a set of filtration surfaces within a filter element of the disclosed methods.

Referring to FIG. 4, FIG. 4 illustrates a second exemplary embodiment of a filter element 200 having at least two sequential filtration surfaces 210 and 220. The aqueous liquid enters (Fluid IN) the filter element 200 and is filtered by the first filtration surface 210 having a given porosity. The aqueous liquid then passes through the second filtration surface 220 and is returned to service in the aqueous cooling system (Fluid OUT).

For the embodiment illustrated in FIG. 4, an optional self-cleaning apparatus is built into the filter element 200, the self-cleaning apparatus able to vacuum the second filtration surface 220. As contamination collects on the second filtration surface 220, the pressure drop across the second filtration surface 220 and/or the filter element 200 increases. Once the pressure drop reaches a setpoint, a vacuum cycle is triggered. A rinse valve 270 opens to an atmospheric drain (Drain) causing a drop in pressure within the filter element 200. The drop in pressure within the filter element 200 creates a backflush stream, thereby pulling the contamination from the second filtration surface 220. The aqueous liquid and contamination are sucked into the conduit 250 via the several nozzles 260. The aqueous liquid and contamination exit the conduit 250 via either of two tubes 240 through the rinse valve 270 and out the drain. The cleaning apparatus that includes the two tubes 240, the conduit 250, and the several nozzles 260 can be driven by a motor 300.

Optionally, one, two or more, including combinations of various devices, of the following devices may be included within the industrial process: a pressure monitoring device, a flow monitoring device, and a turbidity monitoring device, each operably attached to the industrial process so as to provide input related to the biocide demand of the aqueous liquid within the industrial process. Optionally, a microbial monitoring device may be operably attached to the industrial process and provide further input related to the biocide demand of the aqueous liquid within the industrial process. Optionally, a biocide generating device may be operably attached to the industrial system and controlled depending on the measured biocide demand of the aqueous liquid within the industrial process. Non-limiting examples of biocide generating devices include ozone generators, ultraviolet radiation generators, and chlorine generators.

In certain embodiments according to the first, second, and third embodiments disclosed herein, the disclosure is directed toward a method for inhibiting microbial fouling in an aqueous liquid having a biocide demand, which in certain embodiments takes the form of improving efficiency in biocide dosing of the aqueous liquid. In certain embodiments according to the first, second, and third embodiments disclosed herein, the aqueous liquid is present in an industrial process, which in certain embodiments takes the form of an aqueous cooling system. In certain embodiments according to the first, second, and third embodiments disclosed herein, the aqueous cooling system is a recirculation-type aqueous cooling system. In other embodiments according to the first, second, and third embodiments disclosed herein, the aqueous cooling system is a single-pass-type aqueous cooling system.

In certain embodiments according to the first, second, and third embodiments disclosed herein, the aqueous liquid having a biocide demand is treated with a biocide. In certain embodiments according to the first, second, and third embodiments disclosed herein, the treatment takes the form of dosing the biocide at a dosage rate. As it pertains to this disclosure, "dosing" is a species of "treating." Dosing refers to the continuous, semi-continuous, or intermittent combining of a biocide and an aqueous liquid that has a biocide demand. Treatment refers to combining of a biocide and an aqueous liquid that has a biocide demand, even if the combining does not happen in a continuous fashion or on a regular basis. In certain embodiments according to the first, second, and third embodiments disclosed herein, treatment occurs by introducing a biocide in solid, liquid, or gas form into an aqueous liquid. In certain embodiments according to the first, second, and third embodiments disclosed herein, treatment occurs by physically introducing a biocide into an aqueous liquid (e.g., ultraviolet radiation). In certain embodiments according to the first, second, and third embodiments disclosed herein, treatment occurs by generating a biocide in situ (e.g., ozone) from one or more precursors within an aqueous liquid.

The biocide may be one or a combination of more than one chemical substances that are known to effectively kill microbiological organisms or at least inhibit microbiological function (e.g., growth and/or reproduction) when present in a second substance at a known concentration.

Non-limiting examples of biocides include oxidizing biocides, non-oxidizing biocides, or physical biocides. Physical biocides may include, for example, steam sterilization or ultraviolet radiation. Oxidizing biocides include, but are not limited to, stabilized oxidants and halogenated oxidants, which may include chlorine bleach; chlorine; bromine; iodine; materials capable of releasing chlorine, bromine, and/or iodine; inorganic peroxides; organic peroxides; chlorine dioxide; ethylene oxide; ozone; chloramines compounds; precursors thereof, and combinations thereof. Non-oxidizing biocides include, but are not limited to, quaternary ammonium compounds; glutaraldehyde; isothiazolin; 2,2-dibromo-3-nitrilopropionamide; 2-bromo-2-nitropropane-1,3-diol; 1-bromo-1-(bromomethyl)-1,3-propanedicarbonitrile; tetrachloroisophthalonitrile; alkyldimethylbenzylammonium chloride; dimethyl dialkyl ammonium chloride; didecyl dimethyl ammonium chloride; poly(oxyethylene(dimethyliminio)ethylene(dimethyliminio)ethylene dichloride; methylene bisthiocyanate; 2-decyl-thioethanamine; tetrakishydroxymethyl phosphonium sulfate; dithiocarbamate; cyanodithioimidocarbonate; 2-methyl-5-nitroimidazole-1-ethanol; 2-(2-bromo-2-nitroethenyl)furan; beta-bromo-beta-nitrostyrene; beta-nitrostyrene; beta-nitrovinyl furan; 2-bromo-2-bromomethyl glutaronitrile, bis(trichloromethyl)sulfone; S-(2-hydroxy-propyl)thiomethanesulfonate; tetrahydro-3,5-dimethyl-2H-1,3,5-hydrazine-2-thione; 2-(thiocyanomethylthio)benzothiazole; 2-bromo-4'-hydroxyacetophenone; 1,4-bis(bromoacetoxy)-2-butene; bis(tributyltin)oxide; 2-(tert-butylamino)-4-chloro-6-(ethylamino)-s-triazine; dodecylguanidine acetate; dodecylguanidine hydrochloride; coco alkyldimethylamine oxide; n-coco alkyltrimethylene-diamine; tetra-alkyl phosphonium chloride; 7-oxabicyclo [2.2.1]heptane-2,3-dicarboxylic acid; 4,5-dichloro-2-n-octyl-4-isothiazoline-3-one; 5-chloro-2-methyl-4-isothiazolin-3-one; 2-methyl-4-isothiazolin-3-one; precursors thereof; and combinations thereof.

Biocide demand of the aqueous liquid can be monitored using one or more of various operating techniques, including but not limited to backwash count, vacuum count, pressure drop across at least one filtration surface, and measurement of oxidation-reduction potential of at least a portion of the aqueous liquid. One typical technique involves measuring the oxidation-reduction potential ("ORP") of an aqueous liquid or aqueous liquid stream. A decrease in ORP can indicate an increase in microbial activity or a decrease in biocide concentration. In other words, a decreasing ORP typically indicates an increasing biocide demand. A typical ORP-measuring device is an electrochemical measuring device that utilizes a probe. Exemplary embodiments of ORP-measuring devices are available from any of several vendors including, but not limited to, Hach Company, Loveland, Colo., and Rosemount Measurement, Chanhassen, Minn. In certain embodiments, ORP is monitored to determine the biocide demand.

Alternatively or in addition to the above-described operating variables, biocide demand of the aqueous liquid can be measured by counting filtration surface cleaning cycles. A cleaning cycle count (usually an average number of cycles per unit of time) can be correlated to the biocide demand or a change of the biocide demand of the aqueous liquid. Non-limiting examples of cleaning cycles include backwash and vacuum (for appropriately equipped filtration surfaces).

In certain embodiments according to the first, second, and third embodiments disclosed herein, a backwash count per period of time, or change or lack thereof, is correlated to the biocide demand of the aqueous liquid. A typical backwash cycle isolates the filtration surface(s) to be backwashed from use, flows a non-contaminated liquid (usually purified water) in a counter-flow direction through the filtration surface(s), and sends the counter-flowed liquid to a waste stream. Once backwashed, the filtration surface(s) can be returned to service.

Figure 5:
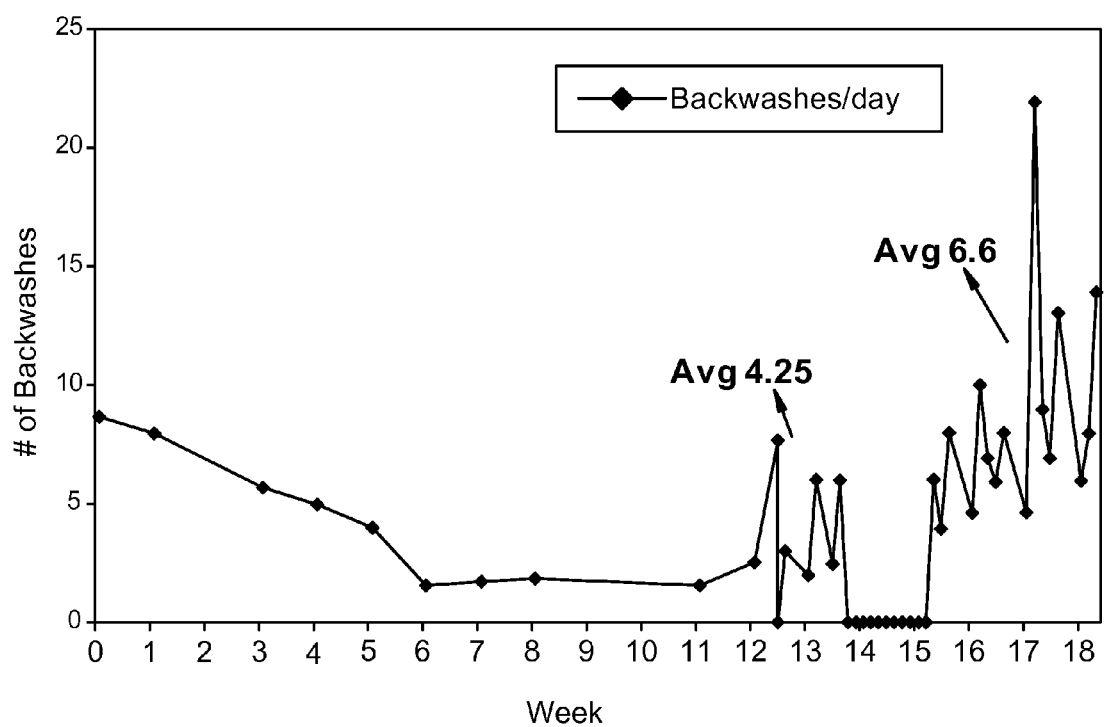
FIG. 5 graphically illustrates data achieved when practicing an embodiment of a disclosed method.

For certain embodiments according to the first, second, and third embodiments disclosed herein, the need for backwash is triggered on an as-needed basis (i.e., not scheduled in advance at set time periods) based on one or more of increased pressure drop across the filtration surface, decreased fluid flux across the filtration surface, or otherwise decreased performance of the filtration surface. For certain embodiments according to the first, second, and third embodiments disclosed herein, a high backwash count can indicate an increased biocide demand for aqueous liquids that are known to have microbial activity. FIG. 5, described in more detail below, illustrates the phenomenon. A change in porosity of the utilized filtration surface (i.e., switching filtration surfaces) may affect the steady state (i.e., take the process out of steady state) and affect the biocide demand and the parameters that may indicate the biocide demand.

In certain embodiments according to the first, second, and third embodiments disclosed herein, one or more of the filtration surfaces that are utilized include self-cleaning apparatuses comprising a vacuum system that removes at least a portion of the debris that has collected on a particular filtration surface. For embodiments that utilize a vacuum system, vacuum count per period of time, or a change or lack thereof, can be correlated to the biocide demand of the aqueous liquid.

In certain embodiments according to the first, second, and third embodiments disclosed herein, pressure drop, or a change in pressure drop or lack thereof over time, across one or more filtration surfaces can be correlated to the biocide demand of the aqueous liquid. In certain embodiments of the present disclosure, reaching a steady state with respect to pressure drop across a filtration surface indicates that the stream being filtered should be diverted to a less porous filtration surface.

In certain embodiments according to the first, second, and third embodiments disclosed herein, at least a portion of an aqueous liquid is diverted to a filtration surface or into a filtration loop, thereby producing a stream. As it pertains to the present application, "diverting" means "causing to move to an identified location." Such diversion can be performed using known techniques such as via piping and/or pumping. In certain embodiments, the portion of the aqueous liquid may be diverted from a container into a conduit (e.g., pipe), from one conduit to another conduit, from a water source to a conduit, or any other suitable arrangement depending on the circumstances.

In certain embodiments according to the first, second, and third embodiments disclosed herein, filtration may be performed via one or more techniques selected from the group consisting of dead end filtration, flow-through filtration, cross-flow filtration, and combinations thereof. Persons having skill in the art of filtration will readily recognize these potential arrangements and the advantages and disadvantages of each.

In certain embodiments according to the first, second, and third embodiments disclosed herein, a stream of an aqueous liquid is initially filtered with a first filtration surface until a steady state is reached. An exemplary technique to determine steady state for this filtration is by monitoring pressure drop across the first filtration surface. Once the monitored pressure drop is reasonably constant for a constant flow rate, the stream of the aqueous liquid is diverted to a second filtration surface that has a lower porosity than the first filtration surface.

In certain embodiments according to the first, second, and third embodiments disclosed herein, a set of at least two sequential filtration surfaces are utilized to filter a stream of an aqueous liquid that has a biocide demand. In certain embodiments according to the first, second, and third embodiments disclosed herein, the set includes at least two filtration surfaces that become less porous in a downstream direction. In certain embodiments according to the first, second, and third embodiments disclosed herein, the set is present in a single filter element. In certain embodiments, the set includes three filter elements that are progressively less porous in a downstream direction.

EXAMPLES

Example 1

Referring to FIG. 5, FIG. 5 illustrates the average number of backwashes per day for an 18-week span for a particular aqueous cooling system. The filter on this particular aqueous cooling system was installed with a 100 micron screen. The number of backwashes indicates the number of times the filter performs the process of cleaning itself following entrapment of solids by the filter. As shown in FIG. 5, after a period of operation the backwash counts steadied to an average of 4.25 backwashes per day. The filter was taken off-line for a short period around week 13 (hence 0 backwashes) and then recommissioned with a smaller porosity (50 micron) screen. The backwash counts thereafter increased to an average of 6.6 per day suggesting that the filter was trapping more debris and hence improving the water quality more than when it had attained a steady state.

Example 2

Figure 6:
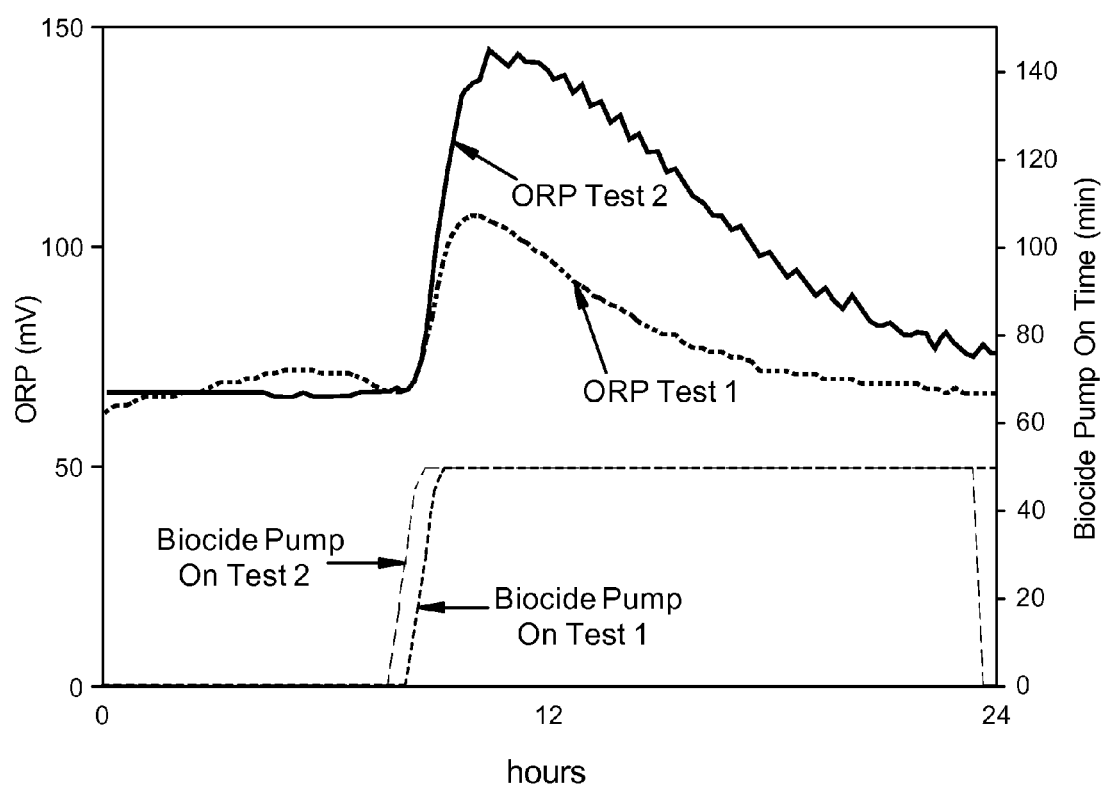
FIG. 6 graphically illustrates data achieved when practicing an embodiment of a disclosed method.

Referring to FIG. 6, FIG. 6 illustrates an aqueous cooling system that was running without an installed filtration system (Test 1). Biocide was dosed as a slug dose into the aqueous liquid, i.e., the biocide was introduced within a short period of time. As a consequence of the biocide dosage, an increase in the oxidation reduction potential ("ORP") of the aqueous liquid was observed. The observed ORP increase gradually declined over time, as the applied biocide was consumed. Consumption of the biocide occurred due to biocide demand, e.g., the presence of inorganic or organic matter in the aqueous liquid, and physical loss due to volatilization.

Subsequent to Test 1, a filter was installed on this system and Test 2 was conducted. After a period of operation of the filter, which had two filtration surfaces (a coarse screen followed by a 100 micron screen) within the filter element, a similar increase in ORP as seen in Test 1 was observed for Test 2. However, the increase in ORP was significantly higher (approximately 30%) for Test 2 than for Test 1, even with overlapping biocide pump run times for Test 1 and Test 2. A more gradual decline in ORP was also observed for Test 2 as compared to Test 1. In other words, an amount of biocide dosage with filtration is significantly more effective in killing microbial growth than the same amount of biocide dosage without filtration. The Test 2 results were unexpected following the use of a filter, as compared to Test 1. In other words, biocide treatment in combination with filtration, particularly dual-stage filtration, can aid with the inhibition of microbial fouling beyond utilizing merely biocide treatment.

Any patents referred to herein, are hereby incorporated herein by reference, whether or not specifically done so within the text of this disclosure.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. See Bryan A. Garner, A Dictionary of Modern Legal Usage 624 (2d ed. 1995). Also, to the extent that the terms "in" or "into" are used in the specification or the claims, it is intended to additionally mean "on" or "onto." Furthermore, to the extent that the term "connect" is used in the specification or the claims, it is intended to mean not only "directly connected to," but also "indirectly connected to" such as connected through another component or components. In the present disclosure, the words "a" or "an" are to be taken to include both the singular and the plural. Conversely, any reference to plural items shall, where appropriate, include the singular.

All ranges and parameters disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The general inventive concepts have been illustrated, at least in part, by describing various exemplary embodiments thereof. While these exemplary embodiments have been described in considerable detail, it is not the Applicants' intent to restrict or in any way limit the scope of the appended claims to such detail. Furthermore, the various inventive concepts may be utilized in combination with one another (e.g., the first, second, and third exemplary embodiments may be utilized in combination with each other). Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

We claim:

1. A method of inhibiting microbial fouling, the method comprising:
providing an industrial process containing an aqueous liquid having a biocide demand and a first filtration surface having a given porosity and at least one operating variable selected from the group consisting of backwash count, vacuum count, oxidation-reduction potential, and combinations thereof;
treating the aqueous liquid with a biocide;
determining the biocide demand of the biocide-treated aqueous liquid by monitoring at least one of the operating variables of the first filtration surface;
providing a stream of the biocide-treated aqueous liquid;
filtering the stream of the biocide-treated aqueous liquid with the first filtration surface to produce a second stream as a filtrate stream that is initially returned to the industrial process, and continuing the filtering and returning of the filtrate stream until a steady state with respect to at least one of the operating variables of the first filtration surface is reached;
identifying that the steady state with respect to at least one of the operating variables of the first filtration surface has been reached by measuring at least one of the operating variables, whereupon the stream of the biocide treated aqueous liquid is diverted away from the first filtration surface to a second filtration surface having a lower porosity than the first filtration surface;
filtering the diverted stream with the second filtration surface to produce a third stream; and returning at least a portion of the third stream to the industrial process.

2. The method of claim 1, wherein the stream of the aqueous liquid is either a full flow stream or a side stream.

3. The method of claim 1, wherein the industrial process is an aqueous cooling system.

4. The method of claim 1, wherein the identifying that the steady state with respect to at least one of the operating variables of the first filtration surface has been reached and the stream diversion from the first filtration surface to the second filtration surface is performed automatically.

5. The method of claim 1, wherein the at least one operating variable is oxidation-reduction potential.

6. The method of claim 1, wherein the at least one operating variable is backwash count.

7. The method of claim 1, wherein the biocide is an oxidizing biocide.

8. The method of claim 7, wherein the oxidizing biocide is selected from the group consisting of chlorine bleach; chlorine; bromine; iodine; chlorine releasing compounds; bromine releasing compounds; iodine releasing compounds; inorganic peroxides; organic peroxides; chlorine dioxide; ethylene oxide; ozone; chloramines compounds; and combinations thereof.

9. The method of claim 1, wherein the biocide is a non-oxidizing biocide selected from the group consisting of quaternary ammonium compounds; glutaraldehyde; isothiazolin; 2,2-dibromo-3-nitrilopropionamide; 2-bromo-2-nitropropane-1,3-diol; 1-bromo-1-(bromomethyl)-1,3-propanedicarbonitrile; tetrachloroisophthalonitrile; alkyldimethylbenzylammonium chloride; dimethyl dialkylammonium chloride; didecyl dimethyl ammonium chloride; poly(oxyethylene(dimethyliminio)ethylene(dimethyliminio)ethylene dichloride; methylene bisthiocyanate; 2-decylthioethanamine; tetrakishydroxymethyl phosphonium sulfate; dithiocarbamate; cyanodithioimidocarbonate; 2-methyl-5-nitroimidazole-1-ethanol; 2-(2-bromo-2-nitroethenyl)furan; beta-bromo-beta-nitrostyrene; beta-nitrostyrene; beta-nitrovinyl furan; 2-bromo-2-bromomethyl glutaronitrile, bis(trichloromethyl) sulfone; S-(2-hydroxypropyl)thiomethanesulfonate; tetrahydro-3,5-dimethyl-2H-1,3,5-hydrazine-2-thione; 2-(thiocyanomethylthio)benzothiazole; 2-bromo-4'-hydroxyacetophenone; 1,4-bis(bromoacetoxy)-2-butene; bis(tributyltin)oxide; 2-(tert-butylamino)-4-chloro-6-(ethylamino)-s-triazine;

dodecylguanidine acetate; dodecylguanidine hydrochloride; coco alkyldimethylamine oxide; n-alkyltrimethylenediamine; tetra-alkyl phosphonium chloride; 7-oxabicyclo[2.2.1]heptane-2,3-dicarboxylic acid; 4,5-dichloro-2-n-octyl-4-isothiazoline-3-one; 5-chloro-2-methyl-4-isothiazolin-3-one; 2-methyl-4-isothiazolin-3-one; precursors thereof; and combinations thereof.

10. The method of claim 1, wherein the biocide is ultraviolet radiation or steam sterilization.

11. The method of claim 1, wherein the biocide-treated aqueous liquid and the diverted stream are filtered by dead end filtration, flow-through filtration, or a combination thereof.

* * * * *